(12) United States Patent
Liu

(10) Patent No.: US 11,891,102 B2
(45) Date of Patent: Feb. 6, 2024

(54) HANDLEBAR FIXING DEVICE AND TOOL CART

(71) Applicant: QINGDAO HUATIAN HAND TRUCK CO., LTD., Qingdao (CN)

(72) Inventor: Zhijun Liu, Qingdao (CN)

(73) Assignee: QINGDAO HUATIAN HAND TRUCK CO., LTD., Qingdao (CN)

( * ) Notice: Subject to any disclaimer, the term of this patent is extended or adjusted under 35 U.S.C. 154(b) by 202 days.

(21) Appl. No.: 17/647,448

(22) Filed: Jan. 7, 2022

(65) Prior Publication Data

US 2023/0174132 A1 Jun. 8, 2023

(30) Foreign Application Priority Data

Dec. 6, 2021 (CN) .......................... 202123045253.5

(51) Int. Cl.
B62B 5/06 (2006.01)
(52) U.S. Cl.
CPC .......... *B62B 5/067* (2013.01); *B62B 2202/48* (2013.01)
(58) Field of Classification Search
CPC ..... B62B 5/067; B62B 2202/48; B62B 3/007; B62B 5/068; B62B 3/02
See application file for complete search history.

(56) References Cited

U.S. PATENT DOCUMENTS

| | | | |
|---|---|---|---|
| 4,708,357 A * | 11/1987 | Soderbaum | B62B 5/067 74/551.8 |
| 4,878,682 A * | 11/1989 | Lee | B62B 3/025 211/195 |
| 6,076,298 A * | 6/2000 | Teel | B62B 3/10 43/54.1 |
| 9,145,154 B1 * | 9/2015 | Horowitz | B62B 5/0013 |
| 10,435,055 B1 * | 10/2019 | Zhu | B62B 3/007 |
| 2014/0197290 A1 * | 7/2014 | Davis | F16M 13/02 248/214 |
| 2015/0035258 A1 * | 2/2015 | Chen | B62B 3/007 280/651 |
| 2017/0320511 A1 * | 11/2017 | Hennessy | B62B 3/1472 |
| 2021/0009178 A1 * | 1/2021 | Kramer | B62B 3/007 |
| 2021/0114643 A1 * | 4/2021 | Sun | B62B 5/067 |
| 2021/0284216 A1 * | 9/2021 | Sun | B62B 5/067 |
| 2022/0306179 A1 * | 9/2022 | Wernberg | B62B 5/066 |

(Continued)

FOREIGN PATENT DOCUMENTS

| | | | | |
|---|---|---|---|---|
| CN | 205976575 U | * | 2/2017 | |
| DE | 202020102363 U1 | * | 9/2021 | ............. B62B 3/001 |
| WO | WO-2020263159 A1 | * | 12/2020 | ............... A61G 5/10 |

*Primary Examiner* — James A Shriver, II
*Assistant Examiner* — Ian Bryce Shelton
(74) *Attorney, Agent, or Firm* — Jeenam Park

(57) ABSTRACT

A handlebar fixing device and a tool cart are disclosed. The handlebar fixing device includes a connecting assembly detachably connected to an enclosure net adjacent to a handlebar, and a fixing assembly arranged on the side of the connecting assembly adjacent to the handlebar, where the fixing assembly is used to fix the handlebar at the fixing assembly. The tool cart includes the handlebar fixing device. When the handlebar rests on the enclosure net, the handlebar is fixed at the fixing assembly and fixed to the enclosure net through the connecting assembly, so that vibration and collision are not easy to cause the handlebar to turn over, thereby reducing the risk of use.

16 Claims, 3 Drawing Sheets

(56) References Cited

U.S. PATENT DOCUMENTS

| | | | |
|---|---|---|---|
| 2023/0042092 A1* | 2/2023 | Yang | ........................ B62B 5/065 |
| 2023/0242168 A1* | 8/2023 | Clemmer | ................ B62B 3/025 |
| | | | 280/651 |

* cited by examiner

HANDLEBAR FIXING DEVICE AND TOOL CART

CROSS-REFERENCE TO RELATED APPLICATIONS

This application claims the benefit and priority of Chinese patent application No. 202123045253.5, filed on Dec. 6, 2021, disclosure of which is hereby incorporated by reference in its entirety.

TECHNICAL FIELD

This disclosure relates to the technical field of cargo transportation, more specifically, it relates to a handlebar fixing device and a tool cart.

BACKGROUND

A tool cart is a type of transportation trolley used for short-distance transportation of goods, which drives goods to move through manual push and pull. Generally speaking, the tool cart includes an arc-shaped bottom protection net, four protection nets respectively arranged on top of the four sides of the bottom protection net, wheels arranged at the bottom of the bottom protection net, and a handlebar rotatably connected to a front end of the bottom protection net. The handlebar is rotatably connected to the front end of the bottom protective net, where the rotational axis of the handlebar is horizontal and the length direction of the handlebar is perpendicular to the rotational axis.

When the tool cart is not carrying out cargo transportation, the handlebar is usually rotated to lean on the protective net near the handlebar. However, simply leaning the handlebar on the protective net by its own weight, the handlebar may not be able to be securely held. Once the tool cart is shaken or collided, the handlebar will easily turn in the direction away from the protective net, and it will easily hit the ground or nearby people and goods, thus posing a risk in use.

SUMMARY

In view of the deficiencies in the related art, the purpose of the present disclosure is to provide a handlebar fixing device and a tool cart. When the handlebar rests on the enclosure net, the handlebar is fixed at the fixing assembly and fixed to the enclosure net through the connecting assembly, so that vibration and collision are not easy to cause the handlebar to turn over, thereby reducing the risk of use.

In order to achieve the above objective, the present disclosure provides the following technical solutions: a handlebar fixing device, including: a connecting assembly, which is detachably connected to an enclosure net near the handlebar;

and a fixing assembly, which is arranged on a side of the connecting assembly adjacent to the handlebar, and the fixing assembly is used to secure the handlebar at the fixing assembly.

By adopting the above technical solution, when the handlebar is resting on the enclosure net, the handlebar is fixed at the fixing assembly by the fixing assembly, and the fixing assembly is fixed to the enclosure net by the connecting assembly, so that when the tool cart is collided or shaken, the handlebar is not easy to be detached from the fixed assembly and turned over, so that it is not easy to hit the ground or nearby people and goods, which reduces the risk of use.

The disclosure is further arranged as follows: the fixing assembly includes two fixing plates, the two fixing plates are elastic fixing plates, and the handlebar can be clamped between the two fixing plates.

The disclosure is further arranged as follows: the fixing plate includes an arc-shaped portion, and the arc-shaped portions of the two fixing plates are fitted with the outer sides of the handlebar when clamping on both sides of the handlebar.

By adopting the above technical solution, by providing two arc-shaped portions, the handlebar can be firmly fixed between the two arc-shaped portions.

The disclosure is further configured as follows: the fixing plate further includes a guide portion fixed on the side of the arc portion away from the connecting assembly, and the two guide portions away from the connecting assembly are inclined in directions away from each other.

By adopting the above technical solution, by arranging two guide portions and slanting the two guide portions the handlebar can be guided between the two arc-shaped portions by the guide plates.

The disclosure is further configured as follows: the fixing plate further includes a connecting portion fixed to the side of the arc-shaped portion close to the connecting assembly, and the two connecting portions near the arc-shaped portions are inclined toward each other on both sides.

The disclosure is further arranged as: the top of the enclosure net close to the handlebar is a crossbar;

the connecting assembly includes a clamping plate, which is attached to the side of the crossbar close to the handlebar;

a top plate, which is fixedly connected to the top of the clamping plate and fits on the top of the crossbar;

a hook rod, attached to the side of the crossbar away from the handlebar and fixed on the top plate, where the hook rod is an elastic hook rod; and a hook, fixed on the hook rod and disposed at the bottom of the crossbar.

The disclosure is further arranged as follows: the bottom of the clamping plate on the side close to the crossbar is provided with an inclined surface, and the bottom of the inclined surface is inclined in a direction away from the crossbar.

By adopting the above technical solution, by providing an inclined surface, it is easier to clamp the crossbar between the clamping plate and the hooking rod.

The disclosure is further arranged in that: the side of the hook close to the clamping plate is an inclined surface, and the bottom of the inclined surface is inclined and arranged in a direction away from the clamping plate.

The disclosure is further configured as follows: the bottom of the crossbar is further fixedly connected with a vertical bar;

There are two hooking rods, both hooking rods are provided with hooks, and the two hooks are respectively disposed on both sides of the vertical rod.

Another object of the present disclosure is to provide a tool cart, including a handlebar fixing device.

In view of the above, compared with the related art, the present disclosure has the following beneficial effects:

1. In the present disclosure, when the handlebar rests on the enclosure net, it is fixed at the fixed assembly and fixed to the enclosure net through the connecting assembly, so that vibration and collision are not easy to cause the handlebar to turn over, thereby reducing the risk of use.

2. The disclosure is able to firmly secure the handlebar between the two arc-shaped portions by providing two arc-shaped portions.

3. The present disclosure is able to guide the handlebar between the two arc-shaped portions through the guide plates by arranging two guiding portions and slanting the two guiding portions.

Figure 1:
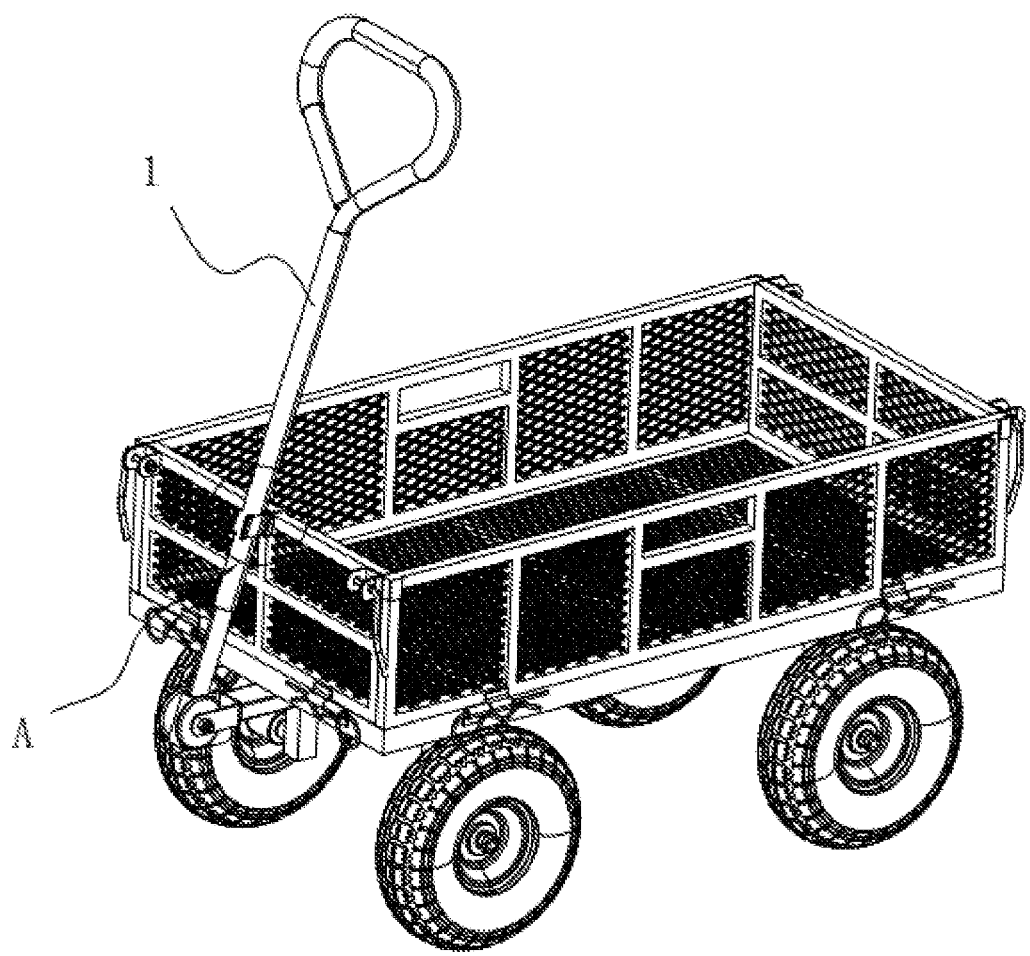
FIG. 1 is a schematic diagram illustrating the embodiment in use.

In the drawings: 1. Handlebar; 2. Crossbar; 21. Vertical bar; 3. Connecting assembly; 31. Clamping plate; 32. Top plate; 33. Hook rod; 34. Hook; 4. Fixing assembly; 41. Fixing plate; 411. Arc-shaped portion; 412. Guiding portion; 413. Connecting portion.

DETAILED DESCRIPTION OF ILLUSTRATIVE EMBODIMENTS

In order to enable those skilled in the art to better understand the technical solution of the present disclosure, the technical solution of the present disclosure will be described clearly and completely in conjunction with the accompanying drawings of the present disclosure. Based on the embodiments of the present application, other similar embodiments obtained by technicians skilled in the art without creative work shall fall within the scope of protection of this application. In addition, the directional or orientational terms mentioned in the following embodiments, such as "up", "down", "left", "right", etc. are only the directions or orientations with reference to the drawings. Therefore, the directional or orientational terms used are used to illustrate rather than limit the present invention.

The present disclosure will be further described below in conjunction with the drawings and illustrative embodiments.

Figure 2:
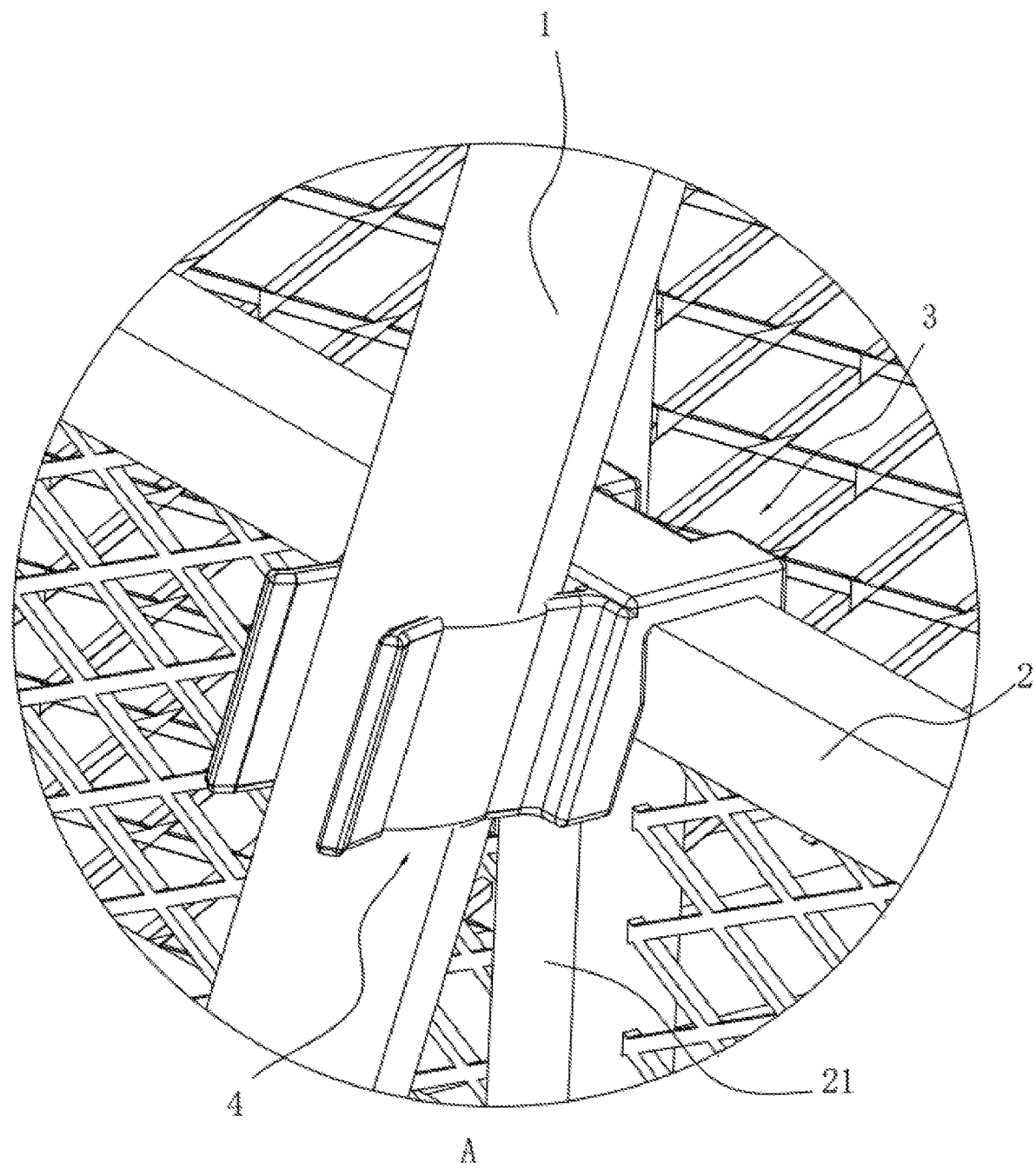
FIG. 2 is an enlarged schematic diagram illustrating part A shown in FIG. 1.
Figure 3:
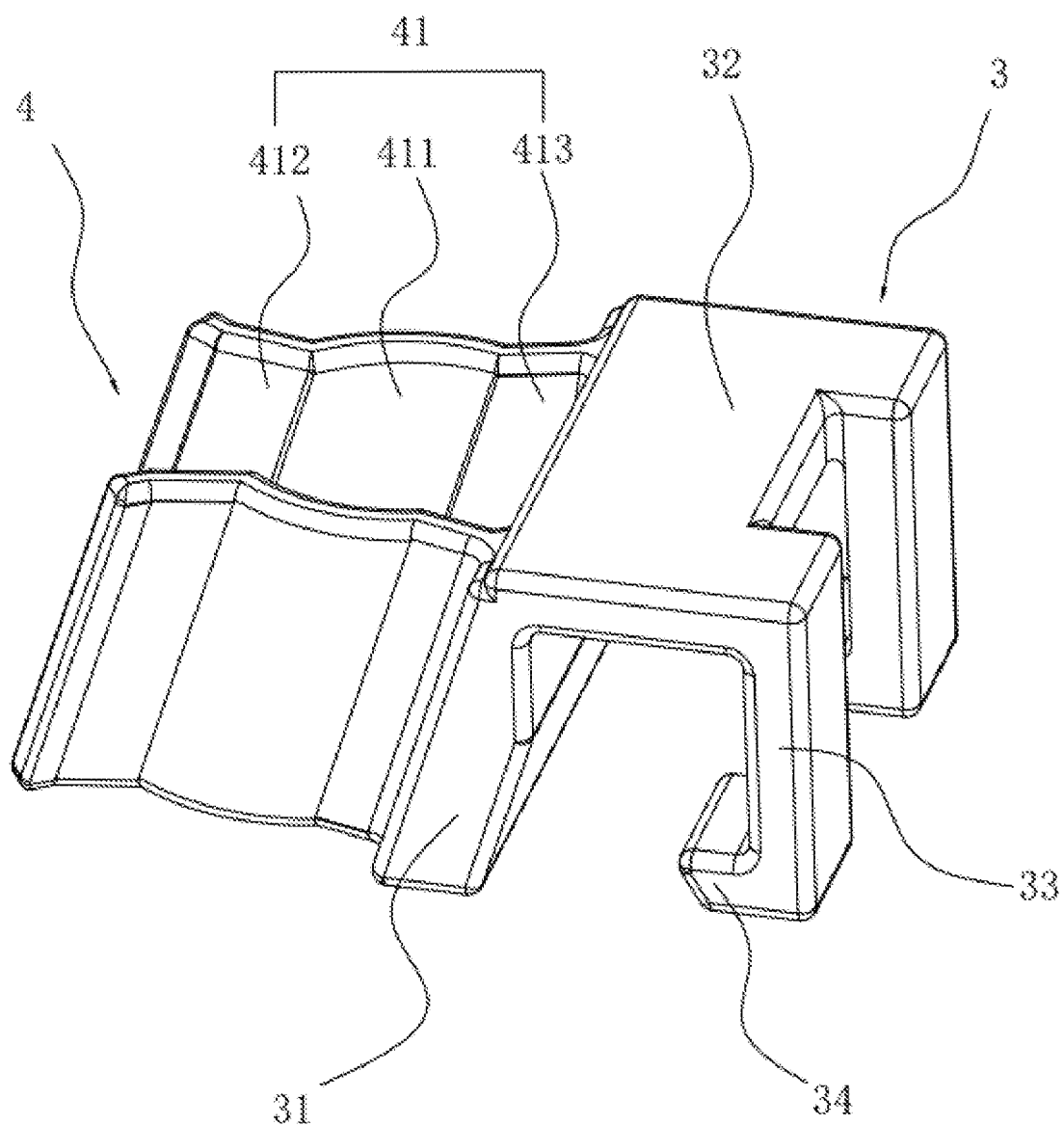
FIG. 3 is a schematic diagram illustrating the overall structure of the embodiment.

First embodiment: A handlebar fixing device, see FIG. 1, FIG. 2 and FIG. 3, includes a connecting assembly 3 detachably connected to the enclosure net near the handle and a fixing assembly 4 arranged on the side of the connecting assembly 3 close to the handle. The fixing assembly 4 can fix the handlebar 1 at the fixing assembly 4, and the fixing assembly 4 is connected to the connecting assembly 3.

When the handlebar 1 rests on the enclosure net, the handlebar 1 is fixed to the fixing assembly 4 by the fixing assembly 4, and the fixing assembly 4 is fixed to the enclosure net by the connecting assembly 3, so that when the tool cart is collided or shaken, The handlebar 1 is not easily detached from the fixed assembly 4 and turned over, so that it is not easy to hit the ground or nearby people and goods, which reduces the risk of use.

Specifically, the fixing assembly 4 includes two fixing plates 41, and the two fixing plates 41 are set as elastic fixing plates 41, through the two fixing plates 41, the handlebar 1 can be clamped between the two fixing plates 41.

Specifically, the portion where the handlebar 1 is fixed to the fixing assembly 4 is a round rod. The fixing plate 41 includes an arc-shaped portion 411. When the handlebar 1 is clamped between the two fixing plates 41, the handlebar 1 is located between the two arc-shaped portions 411 and the two arc-shaped portions 411 are fitted to the outside of the handlebar 1. The two arc-shaped portions 411 are fitted to the outer side of the handlebar 1, so that the handlebar 1 is not easily detached from between the two fixing plates 41, and the stability of the fixation of the handlebar 1 by the fixing plate 41 is improved.

Specifically, the fixed plate 41 further includes a guide portion 412 fixedly connected to the arc-shaped portion 411 away from the side of the connection assembly 3, and the two guide portions 412 away from the connection assembly 3 are inclined toward the direction away from each other on both sides. The two guiding portions 412 are arranged obliquely, so that the handlebar 1 can be inserted between the two guiding portions 412 more easily, and it is easy to be inserted between the two arc-shaped portions 411 through the guidance of the two guiding portions 412.

Specifically, the fixing plate 41 further includes a connecting portion 413 fixedly connected to the side of the arc-shaped portion 411 close to the connecting assembly 3, and the connecting portion 413 is connected to the connecting assembly; specifically, the sides of the two connecting portions 413 close to the arc-shaped portion 411 are inclined toward each other.

Specifically, the top of the enclosure net close to the handlebar 1 is a crossbar 2, and the connecting assembly 3 is connected to the crossbar 2. Specifically, the connecting assembly 3 includes a clamping plate 31 attached to the side of the crossbar 2 close to the handlebar 1, a top plate 32 fixedly connected to the top of the clamping plate 31 and attached to the top of the crossbar 2, a hooking rod 33 fixedly connected to the top plate 32 and attached to the side of the crossbar 2 away from the handlebar 1, and a hook 34 fixed to the hooking rod 33 and located at the bottom of the crossbar 2. The two connecting portions 413 are fixedly connected to the side of the clamping plate 31 away from the hooking rod 33. The hooking rod 33 is set as an elastic hooking rod 33. When fixing the connecting assembly 3 on the crossbar 2, first place the connecting assembly 3 above the crossbar 2, then push the connecting assembly 3 downward, so that the bottom end of the hooking rod 33 is elastically deformed toward the direction away from the clamping plate 31. When the hook 34 moves to the bottom of the crossbar 2, the hooking rod 33 returns to its original shape under the action of its own elastic force. At this time, the clamping plate 31 is attached to the side of the crossbar 2 near the handlebar 1, and the hooking rod 33 is combined on the side of the crossbar 2 away from the handlebar 1, and the hook 34 is located at the bottom of the crossbar 2, thus completing the installation of the connecting assembly 3. When there is no external force to move the hooking rod 33, the connecting assembly 3 is not easily detached from the cross rod 2.

Specifically, the bottom of the clamping plate 31 near the side of the crossbar 2 is provided with a slope, and the bottom of the slope is inclined toward the direction away from the crossbar 2. The hook 34 is also provided as a slope on the side close to the clamping plate 31, and the bottom of the slope is inclined toward the direction away from the clamping plate 31. By providing two inclined surfaces, when the connecting assembly 3 is pressed downward from the top of the crossbar 2, under the action of the two inclined surfaces, the bottom end of the hooking rod 33 can be elastically deformed toward the direction away from the clamping plate 31. Specifically, the bottom of the clamping plate 31 is flush with the bottom of the hook 34, and the distance between the bottoms of the two slopes is greater than or equal to the width of the crossbar 2, so that the crossbar 2 can be more easily inserted between the two slopes, so that the two inclined planes can better play their roles.

Specifically, the bottom of the crossbar 2 is fixedly connected to a vertical rod 21; the connecting assembly 3 includes two hooking rods 33, and both hooking rods 33 are provided with hooks 34. When the connecting assembly 3 is fixed on the crossbar 2, the two hooks 34 are respectively located on both sides of the vertical rod 21. By providing the two hook rods 33 and the two hooks 34 on the two hooks 33, after the connecting assembly 3 is fixed on the crossbar 2, its position is not easy to change along the length direction of the crossbar 2. Specifically, the two hooking rods 33 are fixedly connected to the side of the top plate 32 away from the clamping plate 31 and the two hooking rods 33 are vertically arranged; the two hooks 34 are located on the side of the two hooking rods 33 close to the clamping plate 31.

The working principle of the handlebar fixing device in use is as follows: when the handlebar 1 rests on the enclosure net, the handlebar 1 is clamped between the two arc-shaped portions 411, and the two arc-shaped portions 411 are fixed on the clamping plate 31 through the connecting portions 413. The clamping plate 31 is fixed on the crossbar 2 under the action of the hooking rods 33 and the hooks 34, so that when the tool cart is collided or shaken, the handlebar 1 is not easy to detach from between the two arc-shaped portions 411 and turn over, so that it is not easy to hit the ground or nearby people and goods, reducing the risk of use.

Second embodiment: a tool cart, which includes the handlebar fixing device described in the first embodiment.

The above merely depicts some illustrative embodiments of the present disclosure, and the scope of protection of the present disclosure is not limited to the above-mentioned embodiments. All technical solutions devised or conceived under the idea of the present disclosure fall in the scope of protection of the disclosure. It should be pointed out that for those of ordinary skill in the art, several improvements and modifications made without departing from the principles of the present disclosure should also be regarded as the scope of protection of the present disclosure.

What is claimed is:

1. A handlebar fixing device, comprising:
   a connecting assembly, detachably connected to an enclosure net adjacent to a handlebar; and
   a fixing assembly, arranged on a side of the connecting assembly adjacent to the handlebar and configured to fix the handlebar at the fixing assembly;
   wherein the fixing assembly comprises two fixing plates, each fixing plate comprises an arc-shaped portion, and wherein each fixing plate further comprises a connecting portion fixed on a side of the respective arc-shaped portion adjacent to the connecting assembly, wherein the two connecting portions are inclined toward each other along the direction of drawing nearer to the arc-shaped portions.

2. The handlebar fixing device as recited in claim 1, wherein the two fixing plates are elastic fixing plates, and wherein the handlebar is operative to be clamped between the two fixing plates.

3. The handlebar fixing device as recited in claim 2, wherein the arc-shaped portions of the two fixing plates are fitted closely with an exterior of the handlebar when clamping on both sides of the handlebar.

4. The handlebar fixing device as recited in claim 3, wherein each fixing plate further comprises a guide portion fixed on a side of the arc-shaped portion away from the connecting assembly, wherein the two guide portions are inclined away from each other along the direction of going farther away from the arc-shaped portions.

5. The handlebar fixing device as recited in claim 1, wherein a top of the enclosure net adjacent to the handlebar is a crossbar;
   the connecting assembly comprises a clamping plate, which is fitted with a side of the crossbar adjacent to the handlebar;
   a top plate, which is fixedly connected to a top of the clamping plate and is fitted with a top of the crossbar;
   a hooking rod, which is attached to a side of the crossbar away from the handlebar and fixed to the top plate, wherein the hooking rod is an elastic hooking rod; and
   a hook, which is fixed to the hook rod and is disposed at a bottom of the crossbar.

6. The handlebar fixing device as recited in claim 5, wherein a bottom of a side surface of the clamping plate adjacent to the crossbar comprises a slope, and wherein the slope is inclined away from the crossbar in the direction of going farther away from the crossbar.

7. The handlebar fixing device as recited in claim 6, wherein a side surface of the hook adjacent to the clamping plate is an inclined surface, and the inclined surface is arranged obliquely toward a direction away from the clamping plate in a direction of going farther away from the clamping plate.

8. The handlebar fixing device as recited in claim 7, wherein the bottom of the crossbar is further fixedly connected with a vertical rod;
   wherein there are arranged two hooks, and a hook is arranged on each of the two hooks, and Wherein the two hooks are respectively disposed on both sides of the vertical rod.

9. A tool cart, comprising a handlebar fixing device, the handle bar fixing device comprising:
   a connecting assembly, detachably connected to an enclosure net adjacent to a handlebar; and
   a fixing assembly, arranged on a side of the connecting assembly adjacent to the handlebar and configured to fix the handlebar at the fixing assembly;
   wherein the fixing assembly comprises two fixing plates, each fixing plate comprises an arc-shaped portion, and wherein each fixing plate further comprises a connecting portion fixed on a side of the respective arc-shaped portion adjacent to the connecting assembly, wherein the two connecting portions are inclined toward each other along the direction of drawing nearer to the arc-shaped portions.

10. The tool cart as recited in claim 9, wherein the two fixing plates are elastic fixing plates, and wherein the handlebar is operative to be clamped between the two fixing plates.

11. The tool cart as recited in claim 10, wherein the arc-shaped portions of the two fixing plates are fitted closely with an exterior of the handlebar when clamping on both sides of the handlebar.

12. The tool cart as recited in claim 11, wherein each fixing plate further comprises a guide portion fixed on a side of the arc-shaped portion away from the connecting assembly, wherein the two guide portions are inclined away from each other along the direction of going farther away from the arc-shaped portions.

13. The tool cart as recited in claim 9, wherein a top of the enclosure net adjacent to the handlebar is a crossbar;

the connecting assembly comprises a clamping plate, which is fitted with a side of the crossbar adjacent to the handlebar;

a top plate, which is fixedly connected to a top of the clamping plate and is fitted with a top of the crossbar;

a hooking rod, which is attached to a side of the crossbar away from the handlebar and fixed to the top plate, wherein the hooking rod is an elastic hooking rod; and a hook, which is fixed to the hook rod and is disposed at a bottom of the crossbar.

14. The tool cart as recited in claim 13, wherein a bottom of a side surface of the clamping plate adjacent to the crossbar comprises a slope, and wherein the slope is inclined away from the crossbar in the direction of going farther away from the crossbar.

15. The tool cart as recited in claim 14, wherein a side surface of the hook adjacent to the clamping plate is an inclined surface, and the inclined surface is arranged obliquely toward a direction away from the clamping plate in a direction of going farther away from the clamping plate.

16. The tool cart as recited in claim 15, wherein the bottom of the crossbar is further fixedly connected with a vertical rod;

wherein there are arranged two hooks, and a hook is arranged on each of the two hooks, and wherein the two hooks are respectively disposed on both sides of the vertical rod.

* * * * *